(12) United States Patent
Naka et al.

(10) Patent No.: US 6,283,177 B1
(45) Date of Patent: Sep. 4, 2001

(54) CONVEYING AND PROCESSING SYSTEM FOR RESIN BOTTLES

(75) Inventors: Toshiaki Naka; Yukinobu Nishino; Tatsuhiro Nakada, all of Ishikawa-ken (JP)

(73) Assignee: Shibuya Kogyo Co., Ltd., Kanazawa (JP)

(*) Notice: Subject to any disclaimer, the term of this patent is extended or adjusted under 35 U.S.C. 154(b) by 0 days.

(21) Appl. No.: 09/535,406

(22) Filed: Mar. 27, 2000

(30) Foreign Application Priority Data

Mar. 29, 1999 (JP) .................................................. 11-085859

(51) Int. Cl.⁷ .................................................. B65B 43/42
(52) U.S. Cl. .......................... 141/145; 141/144; 141/165; 141/168
(58) Field of Search ..................................... 141/372, 144, 141/145, 165, 168; 198/803.3, 803.4, 803.7, 377.03, 377.07, 478.1, 867.05; 53/300, 484, 485, 490

(56) References Cited

U.S. PATENT DOCUMENTS

| | | | |
|---|---|---|---|
| 3,087,596 | * | 4/1963 | Fulton . |
| 3,754,637 | * | 8/1973 | Carter et al. . |
| 4,468,277 | * | 8/1984 | Kontz . |
| 4,530,433 | * | 7/1985 | Cucchetto . |
| 5,743,377 | * | 4/1998 | Kronseder .......................... 198/803.9 |
| 5,844,677 | | 12/1998 | Dimmick, Sr. et al. . |
| 5,848,515 | * | 12/1998 | Catelli et al. ............................ 53/167 |
| 6,026,867 | * | 2/2000 | Klarl . |
| 6,082,418 | * | 7/2000 | Naecker et al. ...................... 141/145 |

FOREIGN PATENT DOCUMENTS

| | | |
|---|---|---|
| 195 12 515 | 5/1996 | (DE) . |
| 4-129921 | 4/1992 | (JP) . |
| 6183551 * | 7/1994 | (JP) . |

\* cited by examiner

Primary Examiner—J. Casimer Jacyna
Assistant Examiner—Khoa D. Huynh
(74) Attorney, Agent, or Firm—Flynn, Thiel, Boutell & Tanis, P.C.

(57) ABSTRACT

A resin bottle 16 has an opening at its top end in which a thread 16a is formed, and also has a neck including a cylindrical portion 16b and a flange 16c which are disposed below the opening. An intermediate wheel 8 is disposed between a filler 6 which fills the resin bottle 16 and a capper 10 which caps the filled bottle 16. The intermediate wheel 8 is provided with a plurality of circumferentially spaced grippers 22 each gripping the cylindrical portion 16b of the resin bottle 16, and rotatively conveys the bottle while it is suspended by gripping the neck of the resin bottle. A support 32 is disposed above each gripper 22 for abutment against the opening of the resin bottle 16, whereby in the event the bottom of the bottle 16 is swung radially outward, the opening which is located above the cylindrical portion 16b that is gripped by the gripper 22 is urged by the support 32 from the radial inside, thus allowing the bottle to be maintained in its upright position.

3 Claims, 3 Drawing Sheets

CONVEYING AND PROCESSING SYSTEM FOR RESIN BOTTLES

BACKGROUND OF THE INVENTION AND RELATED ART STATEMENT

The invention relates to a conveying and processing system for resin bottles, and in particular, to a conveying and processing system for resin bottles which allows the bottles to be filled and capped while their necks are held for purpose of conveyance.

A conveying and processing system for resin bottles has been extensively used in the art in which bottles formed of a resin are sequentially handed to a rotary bottle processor such as a filler, a capper or the like to perform a liquid filling or a capping thereof. An intermediate wheel is arranged in such a conveying and processing system between successive rotary bottle processors to hand the resin bottles from processor to processor.

The intermediate wheel which hands over bottles between a rotary filler and capper is provided, an arrangement is also known in the art in which a plurality of pairs of arms which can be opened and closed in each pair are disposed at an equal circumferential spacing around the outer periphery of a revolving body so as to be each capable of gripping the barrel of a bottle to convey and hand it as the revolving body rotates, thus serving as bottle feeder means to feed bottles to a bottle processor such as a filler.

In the described arrangement in which the barrel of the resin bottle is gripped by the pair of arms as the latter open and close for purpose of conveyance, there arises a problem that as the bottle changes in size or configuration, positions where the bottle is gripped and where it is released also change to require an exchange or other adjustment of its attachment. To cope with this problem, there is proposed a conveyor system with an improved flexibility for a combined use in which a neck of a bottle, which experiences a less variation in diameter as compared with the barrel of the bottle, is gripped (Japanese Laid-Open Patent Application No. 129, 921/1992).

When conveying the bottle while holding its neck, if the bottle is allowed to slide on a fixed plate, a friction produced by the bottom surface of the bottle may cause a tilting or an unstable attitude of the bottle. Accordingly, the conveyor system disclosed in the cited reference conveys the bottle in a suspended manner while gripping the bottle neck.

Nevertheless, conveying by rotation the resin bottle while gripping its neck and holding it in a suspended manner causes the bottle bottom to be swung outward under the influence of the centrifugal force, causing a problem of instability in the attitude in which the bottle is conveyed. In particular, when conveying the bottle after it has been filled with liquid by the filler, the increased weight of the bottle increases the influence of the centrifugal force to add to the instability of conveyance, which in turn results in the instability of hand-over operation. A practice in the art which prevents the bottle bottom from being swung outward when it is introduced into a capper has been to provide a guide member toward the outer periphery of the intermediate wheel where the bottle bottom is likely to be situated for abutment against it.

However, this approach suffers from the requirement that the guide member must be replaced whenever the bottle changes it external diameter or height. In addition, because the bottle bottom is constructed soft and exhibits a reduced strength, there is a likelihood that the bottle may be deformed when it abuts against the guide member.

OBJECT AND SUMMARY OF THE INVENTION

Therefore, it is an object of the invention to provide a conveying and processing system for resin bottles without a guide member disposed toward the bottle bottom, which can be used with resin bottles of varying configuration without requiring an adjustment of an attachment and which eliminates the likelihood of deforming resin bottles.

Above object is accomplished in a conveying and processing system for resin bottles comprising a filler for filling a resin bottle while it is being rotatively conveyed, the resin bottle having an opening which is threaded and a neck located below the opening and including a cylindrical portion and a flange which are sequentially disposed, an intermediate wheel for receiving the resin bottle from the filler and for rotatively conveying it while maintaining it suspended by gripping the neck thereof, and a capper for capping the resin bottle received from the intermediate wheel while rotatively conveying it, each of the filler and the capper having a support member which supports the underside of the flange of the resin bottle. In accordance with the invention, the intermediate wheel has a plurality of circumferentially spaced grippers each gripping the cylindrical portion of the resin bottle, and there is provided a support above each gripper which is adapted to abut against the opening of the resin bottle.

DETAILED DESCRIPTION OF THE PREFERRED EMBODIMENT

Figure 1:
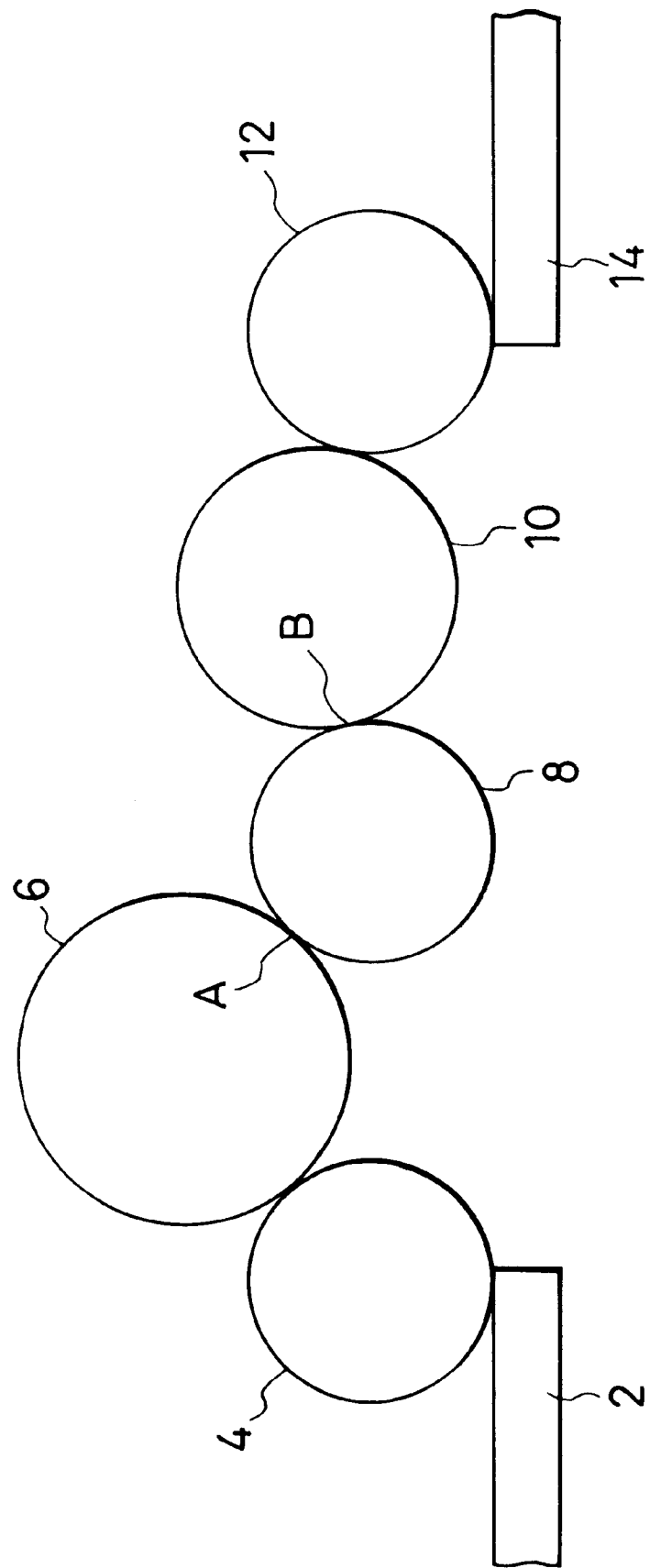
FIG. 1 is a plan view illustrating the entire conveying and processing system for resin bottles according to one embodiment of the invention.

A conveying and processing system for resin bottles according to an embodiment of the invention will now be described. Referring to FIG. 1, an overall arrangement will be initially described briefly. A conveyor 2 continuously conveys resin bottles 16 (refer FIG. 2), which are then fed through an infeed wheel 4 to a filler 6 where liquid is filled into the bottle. The resin bottle which is filled with liquid is rotatively conveyed by an intermediate wheel 8 to be handed to a capper 10. After being capped by the capper 10, the capped resin bottle is delivered through a discharge wheel 12 and is fed to a succeeding step by another conveyor 14.

Figure 2:
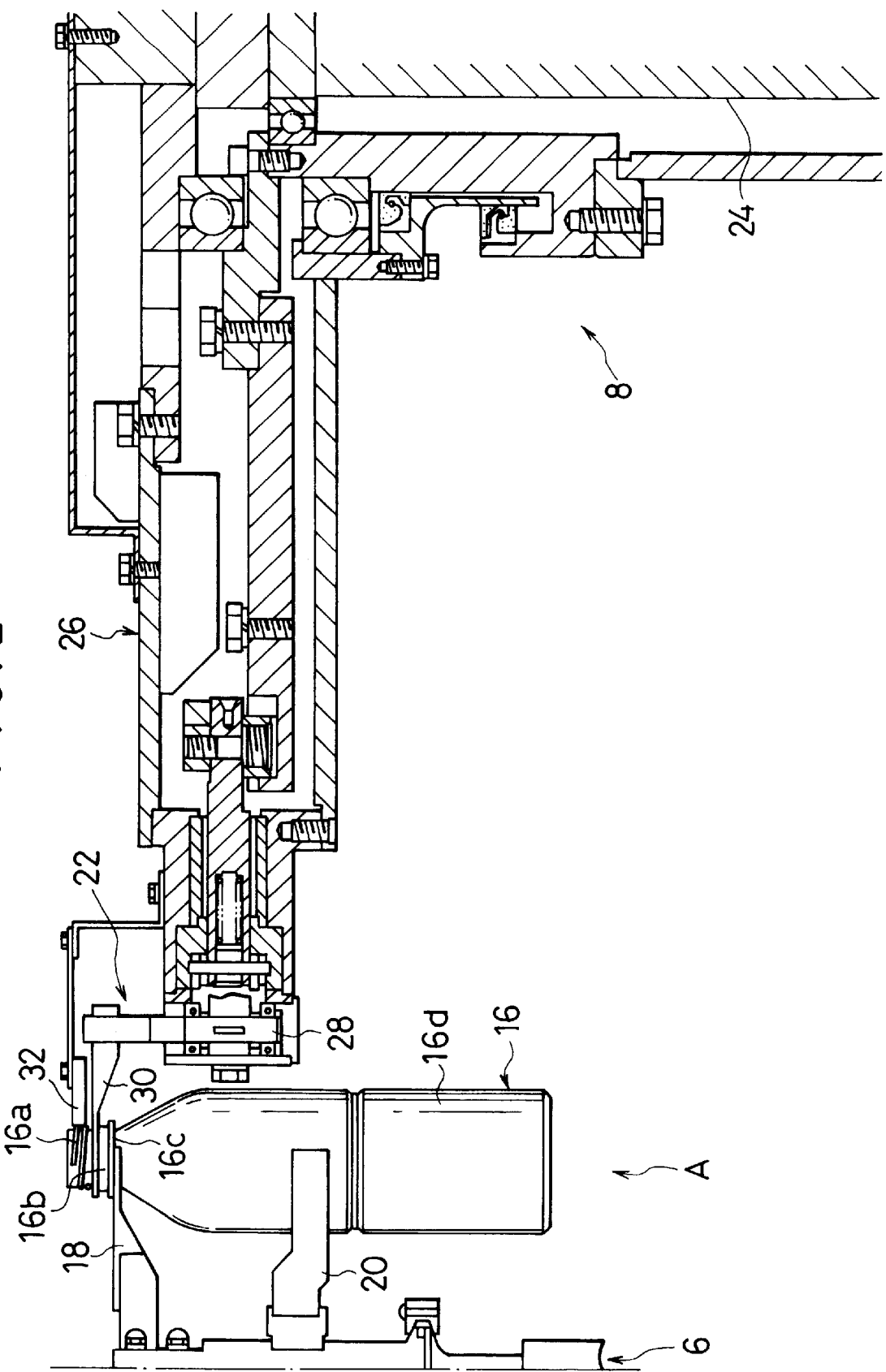
FIG. 2 is a longitudinal section, showing an essential part of the conveying and processing system to an enlarged scale.
Figure 3:
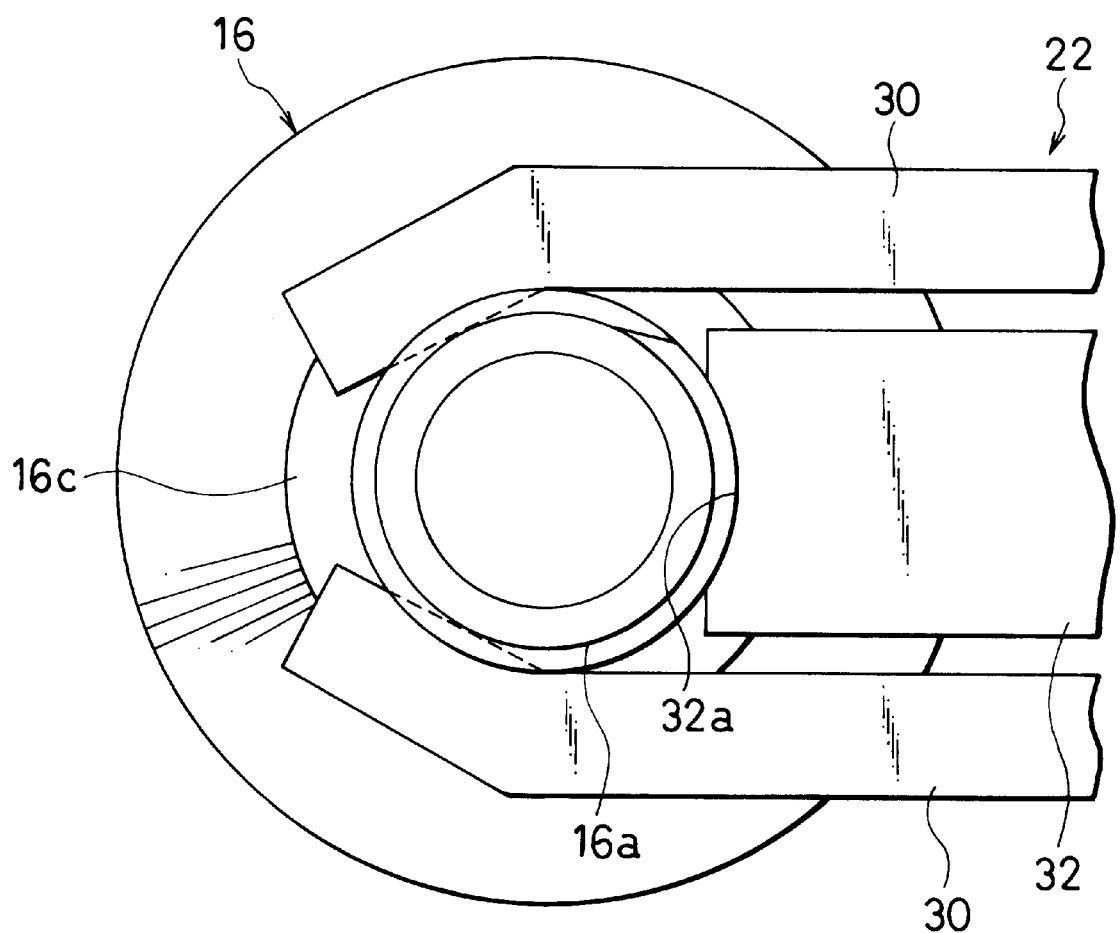
FIG. 3 is a plan view of another essential part of the conveying and processing system.

Referring to FIGS. 2 and 3, a resin bottle 16 is formed with a thread 16a around the outer periphery of a top opening which is threadably engaged by a cap, not shown. In addition, a cylindrical portion 16b of a reduced diameter which coincides with the diameter of a bottom of the thread 16a is formed below the thread 16a, and a flange 16c is formed below the cylindrical portion 16b in a sequential manner. The lower portion of the flange 16c is gradually increased in diameter to provide a funnel-shaped portion, and a region of the bottle from the top opening to the funnel-shaped portion is referred to herein as a neck.

FIG. 2 is a longitudinal section to an enlarged scale of a hand-over section (indicated by A in FIG. 1) which hands over the resin bottle 16 from the filler 6 to the intermediate wheel 8. The filler 6 shown to the left in FIG. 2 is provided with a neck support member (first support member) 18 which supports the underside of the flange 16c of the resin bottle 16, and a barrel holding member 20 which holds a barrel 16d. The combination of the neck support member 18 and the barrel holding member 20 is effective for rotatively conveying the resin bottle 16 while holding it. During the time when the resin bottle 16 is being rotatively conveyed, a filling nozzle, not shown, is inserted into the resin bottle 16 to fill it with liquid at a point upstream of the hand-over section A.

The liquid filled resin bottle 16 is handed over to a gripper 22 of the intermediate wheel 8 from the neck support member 18 of the filler 6 as the filler 6 rotates to a point where the bottle is conveyed to the hand-over section A. The intermediate wheel 8 has a revolving body 26 which is fixedly mounted on the upper end of a central rotating shaft 24, and a plurality of grippers 22 are disposed around the outer periphery of the revolving body 26 at an equal circumferential spacing.

Each gripper 22 includes a pair of arms 30 which are rotatably mounted on a pair of pivot shafts 28 (only one being shown) and which can be opened and closed to grip or release the resin bottle 16. Specifically, at the hand-over section A from the filler 6, the both arms 30 which are opened can be closed to grip the resin bottle 16, whereupon the gripper rotatively conveys the bottle 16 to a hand-over section B (see FIG. 1) to the capper 10 while holding the bottle 16 gripped. At the hand-over section B to the capper 10, the both arms 30 are opened to release the bottle 16. It should be understood that the capper 10 is provided with similar members as the neck support member 18 of the filler 6 or other bottle support means, which is effective to receive the resin bottle 16 from the intermediate wheel 8.

The both arms 30 of the gripper 22 are arranged to grip the cylindrical portion 16b formed between the thread 16a provided at the upper end of the resin bottle 16 and the flange 16c located therebelow from the oppsite sides. Specifically, the neck support member 18 of the filler 6 supports the underside of the flange 16c while the gripper 22 of the intermediate wheel 8 holds the bottle at a location upward of the flange 16c (see FIGS. 2 and 3), thereby preventing an interference between the gripper 22 and the support member 18.

In the conveying and processing system for resin bottles according to the present embodiment, a support plate or support (second support member) 32 which abuts against the external surface of the thread 16a formed around the opening of the resin bottle 16 is disposed above each gripper 22 on the intermediate wheel 8. The support plate 32 has an arcuate abutting surface 32a at its free end in order to support the thread 16a of the resin bottle 16 in a stable manner.

The operation of the conveying and processing system for resin bottles as described above will now be mentioned. The resin bottle 16 which is conveyed on the conveyor 2 is handed over through the infeed wheel 4 onto the filler 6, whereupon it is supported by the neck support member 18 while it is being rotatively conveyed. During the time the bottle is being rotatively conveyed, a filling nozzle, not shown, is inserted into the resin bottle 16 to fill it with liquid.

The resin bottle 16 which is filled with a liquid content is handed over to the gripper 22 of the intermediate wheel 8 at the hand-over section A. The gripper 22 on the intermediate wheel 8 moves to the position of the hand-over section A while maintaining its arms 30 open, and after the neck of the bottle 16 which is supported by the neck support member 18 of the filler 6 is disposed between the both arms 30, the both arms 30 are closed to grip the bottle 16. As the gripper 22 grips the bottle 16, the support plate 32 disposed above the gripper 22 abuts against the thread 16a of the bottle 16.

The resin bottle 16 which is handed over to the intermediate wheel 8 continues to be held by the gripper 22 while it is rotatively conveyed, and is then handed over to the capper 10 at the hand-over section B. A centrifugal force acts upon the bottle 16 which is rotatively conveyed by the intermediate wheel 8, whereby its bottom tends to be swung outward. In particular, the bottle 16 has an increased weight after it is filled with liquid by the filler 6, and accordingly the magnitude of the acting centrifugal force will be greater. With the intermediate wheel 8 according to the present invention, the support plate 32 is disposed above each gripper 22, and retains the resin bottle 16 at a point above the location where the bottle is gripped by the gripper 22 from inside the revolving body 26. Accordingly, the bottom of the resin bottle 16 cannot be swung outward, but is allowed to be conveyed while maintaining a substantially upright position when it is handed over to the capper 10.

In this manner, as a result of conveying the resin bottle 16 by the intermediate wheel 8 while allowing the gripper 22 and the support plate 32 which is located above it to maintain a stable position of the bottle, the hand-over to the capper 10 is allowed to take place in a stable manner. There is no need to provide a guide member for guiding a portion of the resin bottle 16 adjacent to the bottom thereof. Accordingly, if the system is used with bottles 16 of differing size and configuration, there is no need to replace any such guide member, thus improving the flexibility. It will also be noted that no guiding action for the bottom of the resin bottle 16 is utilized, but rather a rigid portion, namely, the thread 16a is supported by the support plate 32, eliminating the likelihood of deforming the bottle 16.

After the resin bottle 16 is handed over from the intermediate wheel 8 to the capper 10 at the hand-over section B, the bottle is capped during the time it is being rotatively conveyed by the capper 10. Subsequently, the resin bottle 16 is passed through the discharge wheel 12 and then through the conveyor 14 to be fed to the subsequent step.

In the described embodiment, a single intermediate wheel 8 is disposed between the filler 6 and the capper 10. However, rather than a single intermediate wheel, a plurality of intermediate wheels may be provided. In addition, the construction of the gripper 22 or the configuration of the support plate 32 is not limited to the one shown, but that any other arrangement providing a similar function may be used.

What is claimed is:

1. A conveying and processing system in combination with resin bottles, comprising a filler for filling a resin bottle while it is being rotatively conveyed, the resin bottle having an opening portion which is threaded and also having a neck below the opening portion and including a cylindrical portion and a radially outwardly extending flange which are sequentially formed, an intermediate wheel for receiving the resin bottle from the filler, for gripping the resin bottle at the neck, for suspending the resin bottle so that a bottom of the resin bottle is free of engagement with a support surface and for rotatively conveying it while maintaining it suspended by gripping the neck, and a capper for capping the bottle while rotatively conveying the resin bottle which is received from the intermediate wheel, the filler and the capper each having first support members which support the underside of the radially outwardly extending flange of the resin bottle; and the intermediate wheel having a plurality of circumferentially spaced grippers each of which grips the cylindrical portion of the resin bottle and a second support member above each gripper which simultaneously abuts against the opening portion of the resin bottle to thereby stabilize the resin bottle during the rotative conveyance.

2. A conveying and processing system in combination with resin bottles according to claim 1, wherein each gripper comprises a pair of arms which are opened and closed to grip or release the neck of the resin bottle.

3. A conveying and processing system in combination with resin bottles according to claim 1, wherein each second support member has an arcuate abutting surface on its free end which abuts against the opening portion of the resin bottle.

* * * * *